United States Patent [19]

Lowerre, Jr.

[11] 4,309,940
[45] Jan. 12, 1982

[54] INFUSION TYPE BEVERAGE MAKER

[76] Inventor: William M. Lowerre, Jr., 7458 Colton La., Sudley Station, Manassas, Va. 22110

[21] Appl. No.: 98,692

[22] Filed: Nov. 29, 1979

Related U.S. Application Data

[63] Continuation of Ser. No. 753,504, Dec. 22, 1976, abandoned, and a continuation-in-part of Ser. No. 324,301, Jan. 17, 1973, abandoned.

[51] Int. Cl.³ .............................................. A47J 31/10
[52] U.S. Cl. ...................................... 99/281; 99/307; 99/311; 99/316; 99/285
[58] Field of Search ................. 99/280, 281, 282, 283, 99/300, 302 R, 304, 307, 308, 313, 314, 315, 316, 317, 311, 295, 285

[56] References Cited

U.S. PATENT DOCUMENTS

| | | | |
|---|---|---|---|
| 1,581,871 | 4/1926 | Roberts | 99/314 X |
| 1,582,685 | 4/1926 | Pence | 99/313 X |
| 1,916,369 | 7/1933 | Harpster | 99/282 |
| 1,943,386 | 1/1934 | Johnson | 99/313 X |
| 2,046,710 | 7/1936 | Umstott | 99/314 |
| 2,246,061 | 6/1941 | Nowland | 99/281 X |
| 2,856,842 | 10/1958 | Schwaneke | 99/284 X |
| 3,093,061 | 6/1963 | Rodwick | 99/281 |
| 3,144,547 | 8/1964 | Price | 99/281 X |
| 3,333,528 | 8/1967 | Bender | 99/305 |
| 3,333,964 | 8/1967 | Bender | 99/299 |
| 3,380,374 | 4/1968 | Lowerre | 99/281 |
| 3,682,089 | 8/1972 | Unger | 99/281 |

Primary Examiner—Robert W. Jenkins
Attorney, Agent, or Firm—Cushman, Darby & Cushman

[57] ABSTRACT

An automatic drip coffee maker makes drip coffee by providing a relatively small water reservoir that holds less than the total quantity of water. The coffee maker automatically transfers the remainder of the total quantity of water to the beverage storage container. The coffee maker also automatically heats the water in the reservoir and transfers it to a basket of ground coffee to make a concentrated brew which drips into the storage space which already contains a quantity of water sufficient to dilute the concentrated brew to a desired drinking strength. The same beverage strength is produced over a narrow range of brewing times for a wide range of cups brewed. The coffee maker is significantly smaller overall than conventionally configured drip coffee makers. The convenience of conventional coffee makers is maintained, e.g. structural components to be handled by the user do not exceed those of a conventional percolator. Other than one or more bimetal thermostats, there are no moving parts. The invention is adaptable in part to various drip coffee maker configurations, and in part to percolators.

15 Claims, 8 Drawing Figures

INFUSION TYPE BEVERAGE MAKER

This is a continuation-in-part of application Ser. No. 324,301 which was filed Jan. 17, 1973, now abandoned, and a continuation of application Ser. No. 753,504 which was filed Dec. 22, 1976, now abandoned.

This invention relates to devices for making infusion type beverages, such as coffee and tea, and in particular it relates to an improvement over the devices and methods described in my prior U.S. Pat. No. 3,380,374 issued Apr. 30, 1968.

For purposes of uniformity, the discussions which follow contemplate the use of a constant ratio of water to ground coffee, regardless of the capacity of the coffee maker and regardless of the amount of beverage being made by the given coffee maker. The Coffee Brewing Center of the Pan American Coffee Bureau has recommended a ratio of two level tablespoons of ground coffee for each six ounces of water used to make coffee beverage. The Center also recommends a coffee-water contact time of 4 to 6 minutes for drip grind coffee, and a beverage strength of 1.15% to 1.35% dissolved solids. Its recommendation is based on studies from which it concluded that 85% of Americans prefer coffee when brewed in this manner. The following discussion uses the term "preferred" to refer to these conditions and the resultant beverage. However, the invention will accommodate a wide range of specifications.

BACKGROUND OF THE INVENTION

Automatic electric drip coffee makers produced commercially for the household appliance market, and others, are of two basic configurations. In one configuration the heating elements are attached to the beverage storage container so that they are inseparable by the user, as with percolators and devices as described in my prior patent. In the more conventional configuration the beverage storage container is not itself electrified, but rests instead on an electrically heated hot plate or the like. Either configuration may employ gravity to continuously transport heated water to the coffee bed below a water reservoir, or may employ a lifting system such as the well-known percolator pump arrangement to incrementally transport heated water to the coffee bed located above a water reservoir.

My prior patent discloses a drip type coffee maker which uses a percolator type pump to lift hot water increments to a basket of coffee grounds, as well as one that depends on gravity flow. The device is constructed so that only water passes to the coffee bed, and the resulting brewed coffee is collected and maintained in a beverage storage container which is separate from the water applied to the coffee bed. Thus the brewed coffee does not enter the pump well to be vigorously boiled and re-boiled in the pump well, and the known bitterness imparted by such action is avoided. In the device described in my prior patent, and in the more conventional configuration, the total volume of water and the volume of coffee beverage ultimately brewed must be contained within separate chambers forming part of the overall device. Thus both compartments must be of a size sufficient to hold a volume of liquid equivalent to the full amount required to brew the desired volume of coffee beverage. Therefore, if for example, a 10 cup percolator were to be converted to a drip process unit, using the concept of my prior patent and yet still retain the 10 cup capacity, then the water reservoir and coffee basket would have to be located largely outside the percolator body, thereby greatly increasing the total volume of the device. Alternatively, if the water reservoir is placed wholly within the existing percolator container to achieve a manageable size, then the coffee brewing capacity of the device would be severely reduced, i.e., approximately 50%. The more conventionally configured drip coffee makers are similarly handicapped by requiring both the beverage storage container and the water reservoir to each be capable of holding the total quantity of liquid employed.

Furthermore, the coffee makers described in my prior patent, and electric percolators, and electric household drip coffee makers in general, simultaneously heat and brew, by incrementally or continuously transporting heated solvent (water in the case of drip coffee makers; water followed by re-cycled beverage in the case of percolators) to the coffee bed while some portion of the remainder is being heated. Given the typical fixed wattage coffee maker with a convenient, low cost, fixed dimension coffee basket, the strength or percent dissolved solids of the resulting beverage will increase with an increase in cups brewed for the following reasons: one, a greater quantity of solvent is provided to the coffee bed over a greater period of time as cups brewed increases, and two, each increment of solvent takes longer to pass through the coffee bed, since the depth of the coffee bed increases as cups brewed increases. Solids extraction is in turn proportional to the amount of water contacting a specific quantity of grounds in a given length of time, and to the length of time a given quantity of water is in contact with the grounds.

User-operated mechanism to: (a) decrease the cross sectional area of the coffee basket as quantity brewed decreases (tending to maintain a fixed depth of grounds) or, (b), to vary the amount of heated solvent which is diverted around rather than through the coffee bed in inverse relation to quantity brewed, are mechanisms sometimes employed to compensate for these effects. The penalties are increased complexity, with attendant increase in economic cost and increased difficulty in cleaning by the housewife or other user.

SUMMARY OF THE INVENTION

One aspect of the present invention is based on the observation that in making a beverage by infusion it is not necessary to pass all of the water through the bed of ground coffee or other solids, nor is it necessary to heat all the water in the same chamber. Thus according to this aspect there is provided a drip beverage maker which makes a beverage by passing a portion of the initial water charge directly to the beverage container and by passing through the bed of solid material water in an amount less than the total desired volume of beverage and then diluting the resulting concentrated infusion to the desired volume. This has the distinct advantage of reducing the size of a beverage maker of the type disclosed in my prior patent, and of other conventional drip coffee makers, because, for a given maximum capacity of final beverage, it is not now necessary to make the water reservoir as large as the beverage storage container. This is so since the container and reservoir together now share the total volume of water initially placed in the coffee maker. For example, experimentation has demonstrated that seven cups of coffee of the preferred flavor can be obtained by passing only three cups (approximately) of heated water through the bed of ground coffee and by then diluting the resulting concentrated brew with four cups of water. Thus only three cups, not seven, of water would be placed initially in the water reservoir, while the remaining four cups would be placed initially in the beverage storage container. In practice all seven cups would usually be placed in the 3-cup water reservoir, with four cups caused to bypass and be channelled to the beverage storage container at a lower level. It is then possible to substantially reduce the size of the water reservoir from the inconvenient and commercially disadvantageous size previously contemplated without reducing the coffee brewing capacity of the unit. Additionally, a measurable and thus significant energy saving results from pumping only a portion of the water to the elevated coffee basket in those configurations employing pumps.

In accordance with this first aspect of the invention, the water placed initially in the beverage storage container must be heated so that the mixture of drip-brewed coffee concentrate and the water initially in the beverage storage container will be at an appropriate serving temperature when the reservoir is evacuated. This can be accomplished by providing the storage container with an additional heater and thermostat separate from those used for the reservoir, and pump if used. Alternatively, heating of the initial water in the storage container can be achieved by placing the reservoir heater so that the water in the beverage storage container can be heated by conduction simultaneously with heating and transporting of the water from the reservoir. The latter arrangement may not be economically feasible in the conventional configuration employing gravity transport.

According to a second aspect of the invention the heating arrangement in a drip coffee maker is constructed and operated in such a manner that the coffee maker produces a beverage of preferred flavor over a greater proportion of the capacity of the device than conventional coffee makers of similar simplicity. As discussed previously, other things being equal, the strength of a coffee beverage is a function of the depth of the coffee bed and of the volume of water transported to the coffee bed. In a household percolator, and in my earlier patented drip coffee maker and others, when a larger volume of coffee beverage is desired, both the depth of the coffee grounds and the liquid volume transported to the coffee bed are increased. As a result, the water-grounds contact time and the strength or percent dissolved solids are also increased. Both contact time and strength have a major impact on flavor of the finished beverage. Extended contact time causes bitterness; too short a contact time causes weakness and wastes ground coffee.

In the present invention, in normal use, all water to be used in the finished beverage is delivered initially to the water reservoir which is of fixed, relatively small capacity. Water in excess of the reservoir capacity is channelled directly to the beverage storage container which is located at a lower level, without passing to or through the bed of coffee grounds. Thus the water reservoir will contain a fixed quantity of water initially, while the beverage storage container will initially contain varying quantities of water, increasing as the quantity being brewed increases. As a result the quantity of water transported to the coffee bed is a constant regardless of cups being brewed, as is the time required for its transport. But, while the preferred ratio of water to ground coffee has been maintained in total, the amount of water which is passed to the coffee bed increases in relation to the quantity of ground coffee as the quantity of beverage being brewed decreases. In the previous example, only 3 cups of water (3/7 of the total) are passed to the 7-cup coffee bed, when 7 cups are being brewed, while 3 cups (3/3, or all of the total) are passed to the 3-cup coffee bed when only 3 cups are being brewed. Increasing the portion of the total amount of water that is passed to a given coffee bed will increase the quantity of solids extracted from the bed, and percent dissolved solids in the finished beverage will increase. This effect is in direct opposition to the effect caused by the corresponding decrease in the depth of the grounds. Thus near constant strength can be maintained even as constant brewing time is maintained over a wide range of brewing capacity. The effects discussed are not perfectly linear, but the effect is essentially as described.

In my earlier invention, and in conventional household drip coffee makers, the heat input is directed primarily to the water in the reservoir, in order to elevate it in temperature prior to transfer to the coffee bed, this being another requisite for preferred flavor. Since all the water is transferred, and thus elevated in temperature prior to descending to the beverage storage container, only the lesser heat input required to keep the beverage warm is required in conjunction with the beverage container. In the present invention, however, the portion of the water bypassed from the reservoir to the container initially is cold and must be elevated to serving temperature in the beverage storage container. Hence greater wattage must be associated with the beverage container. Some conventional household drip coffee maker configurations when employing the present invention, would thus have two main heaters, each capable of elevating the temperature of the contents of the corresponding liquid containing compartment. This is so since the water reservoir and beverage container are not contiguous. As in typical coffee maker practice, a separate, low wattage heater would be used to keep the beverage warm after brewing.

Coffee makers patterned after my previous invention and some conventional configurations, will also operate with a similar three heaters. However, since the beverage storage container in these configurations is contiguous with a portion of the pump well, which receives water from the reservoir a single heater appropriately configured will suffice to simultaneously heat the contents of both the water reservoir and the beverage container. The low wattage, "keep warm" heater is retained as before. Clearly this arrangement is extremely cost effective. Equally clearly, the contents of each compartment must be heated simultaneously, or in time parallel. In view of the 15 ampere capacity of the typical household electrical outlet, a limit is placed on the volume of liquid that can be elevated to serving temperature within the time limits imposed by the recommendations for "preferred" coffee. A practical limit is approximately 8 to 10 cups if drip grind coffee is used, somewhat more if percolator grind is used, and still more if brewing time limits are relaxed.

Therefore, according to another aspect of the invention, a greater capacity is obtained while still meeting the preferred brewing time limits, by utilizing two heaters, but operating them in time series, rather than simultaneously. In this form of the invention the water which is placed initially in, or bypassed to, the beverage container is heated by a storage heater. This heater is then switched off and the water reservoir or pump heater is simultaneously switched on. The water reservoir or pump heater is turned off when the reservoir is exhausted. In this way only the water reservoir capacity is constrained to 8 or 10 cups by the combined 15 ampere and preferred brewing time limits. Total capacity is constrained only by the fraction of water which must be passed to the coffee bed to obtain the preferred strength in the preferred time period. In the example, total capacity would thus be limited to about 19 to 23 cups when using drip grind coffee. Capacity is expressed here as a range, since cup size, heat transfer properties of materials, and other factors may vary in practice. Use of percolator grind coffee with its higher upper limit of preferred brewing time would permit capacity of approximately 25 to 31 cups, while relaxing the time constraints would permit even more.

In the present invention as with other coffee makers, electrical current flow may be initiated by a switch or by attaching the plug on the appliance cord to a convenient wall outlet. Switchover from the beverage storage container heater to the reservoir heater when operated in time series, and switchdown to keep warm for all the arrangements, are accomplished automatically by means of thermostats or timers, thermostats generally being more economical. In the case of drip coffee makers using gravity transport, a thermostatically controlled valve may be employed to retain the water in the reservoir until an increment is heated sufficiently to begin transport to the coffee bed.

Preferred flavor may be produced over a greater range of cups brewed than is the case for conventional electric drip coffee makers, and those patterned after my previous invention as will be seen from the following discussion. Regardless of the method of transporting heated water to the coffee bed, heating and transport of the water will require a time period that varies with the quantity being heated and transported, given the conventional resistance heater and fixed line voltage. For example, a conventional coffee maker requiring 6 minutes to heat 6 cups a specified number of degrees will require 4 minutes to heat 4 cups the same number of degrees from the same initial temperature, assuming no heat losses and ignoring the mass of the coffee maker. If the coffee maker employed the percolator pumping principle for transport, it would thus be limited by the preferred flavor time constraint to this 4 to 6 cups range of capacity. Another unit employing gravity transport would similarly require an increasing length of time to transport an increasing amount of water. With the present invention the brewing time cycle can be constant (or nearly so) over a wide range of cups brewed, since the quantity of water to be transported is the same for all quantities brewed in a given drip coffee maker.

It should be evident that when brewing different quantities of beverage, using single or parallel two heater operation and a fixed time cycle, that the end temperature of the finished beverage will vary inversely with the quantity of beverage being brewed. According to another aspect of the invention, an adjustable thermostat is used to sense the temperature of the beverage and, in response to a predetermined beverage temperature, to terminate current flow to the main heater or heaters and to commence current flow to the keep-warm heater. The thermostat is calibrated for user setting in terms of cups to be brewed, scaled inversely with temperature sensed by the thermostat, (e.g. with a given heater, 4 cups might shut off the main heater(s) at 210° F. in 5 minutes, while 6 cups would shut down at 153° F. in the same length of time).

It is desirable to take advantage of the full range of preferred brewing time, rather than a fixed brewing time in order that the range of temperature of the finished beverage may be minimized over the maximum range of cups to be brewed. This can be accomplished by appropriate selection and calibration of the operating temperature range of the adjustable thermostat. (e.g. with a given heater, 4 cups might shut off at 210° F. in 4 minutes, while 8 cups might shut off in 6 minutes at 175° F.) This in turn requires that the constant capacity reservoir be emptied over a corresponding range of time. This is accomplished in the following manner. The water initially placed in the beverage storage container increases in mass as the number of cups brewed increases. Since the mass increases it takes longer to heat; conversely, after a given period of heating time, the increased mass is at a lower temperature. For those configurations where the reservoir liquid is in thermal contact with the contents of the beverage storage container, heat transferred through the separating wall from the container contents to the reservoir contents during a given time period will be less as the mass in the container increases. This will result in a somewhat longer period of time being required to exhaust the reservoir when a larger quantity is being brewed, exactly as desired. Judicious choice of materials and dimensions will further influence this effect.

When the water reservoir heater and the beverage storage container heaters are operated in time series, either the thermostat that switches current from the beverage container heater to the water reservoir heater, or the thermostat that cuts off the reservoir heater, may be the adjustable one. If the switching thermostat is adjustable and the cut off thermostat is fixed, then the temperature of the mixed beverage will be a constant regardless of the cups brewed. In the reverse situation the beverage temperature at cut off of the reservoir is variable.

The pump well or reservoir heater rises in temperature more rapidly once the reservoir has been exhausted. According to another aspect of the invention it is therefore possible to use a fixed thermostat to sense the temperature of the heater rather than an adjustable thermostat to sense the temperature of the contents of the beverage container.

According to another aspect of the invention, a drip coffee maker of the primary type disclosed in FIGS. 1 and 6 of my prior patent, can be constructed without the second wall surrounding the water reservoir, at an appreciable savings in material and related costs and increased convenience in cleaning. In FIGS. 1 and 6 of the earlier invention the extracted beverage and any water overflowing the coffee basket was required to flow outside the reservoir, and an additional wall surrounding the reservoir was required for protection of both the beverage and the user. The double wall was eliminated in FIG. 3 of the earlier invention by collecting the extract and any overflow from the coffee bed and channelling it to and through a central tube, concentric with the pump tube, and thence to the beverage container below. This arrangement had the following several disadvantages: Since beverage was passed through the central tube, the tube required cleaning after use, and the pump tube passing within it made it difficult to clean, or required the additional complexity of a removable pump tube assembly. It also employed two or more connecting tubes between the reservoir and the pump, further increasing the number of awkwardly positioned surfaces coming in contact with the coffee beverage and thus requiring cleaning. In the present invention the coffee beverage and any overflow is collected on leaving the coffee bed and is channelled to a tube that is not concentric with the pump tube for passage to the beverage container below. This arrangement eliminates the previously cited disadvantages.

In a specific application of the present invention, brewed beverage leaves the coffee basket radially outward, not through holes in the bottom as is typical. An annular trough then directs the beverage and any overflow from the basket to a non-concentric tube through which it can fall to the beverage container below. The arrangement is economical of materials and related cost, and is easy to use and clean.

In the more conventional configurations bypass of a portion of the water from the water reservoir to the beverage container is similarly accomplished by use of a standpipe of appropriate height within the reservoir. Bypass water may be channelled through a tube within the coffee bed, or routed in any other way that prevents the bypass water from contacting the grounds, as for example, it may be routed to the spout of the beverage container or carafe. A tube is often provided in the coffee basket to permit overflow in the event water should not pass through the coffee bed as fast as it is provided to the coffee bed. This tube may also be employed to channel the initial bypass water from the smaller water reservoir to the beverage container and may be centrally or non-centrally located.

The invention will be further understood from the following detailed description of exemplary embodiments taken with the drawings in which.

Figure 1:
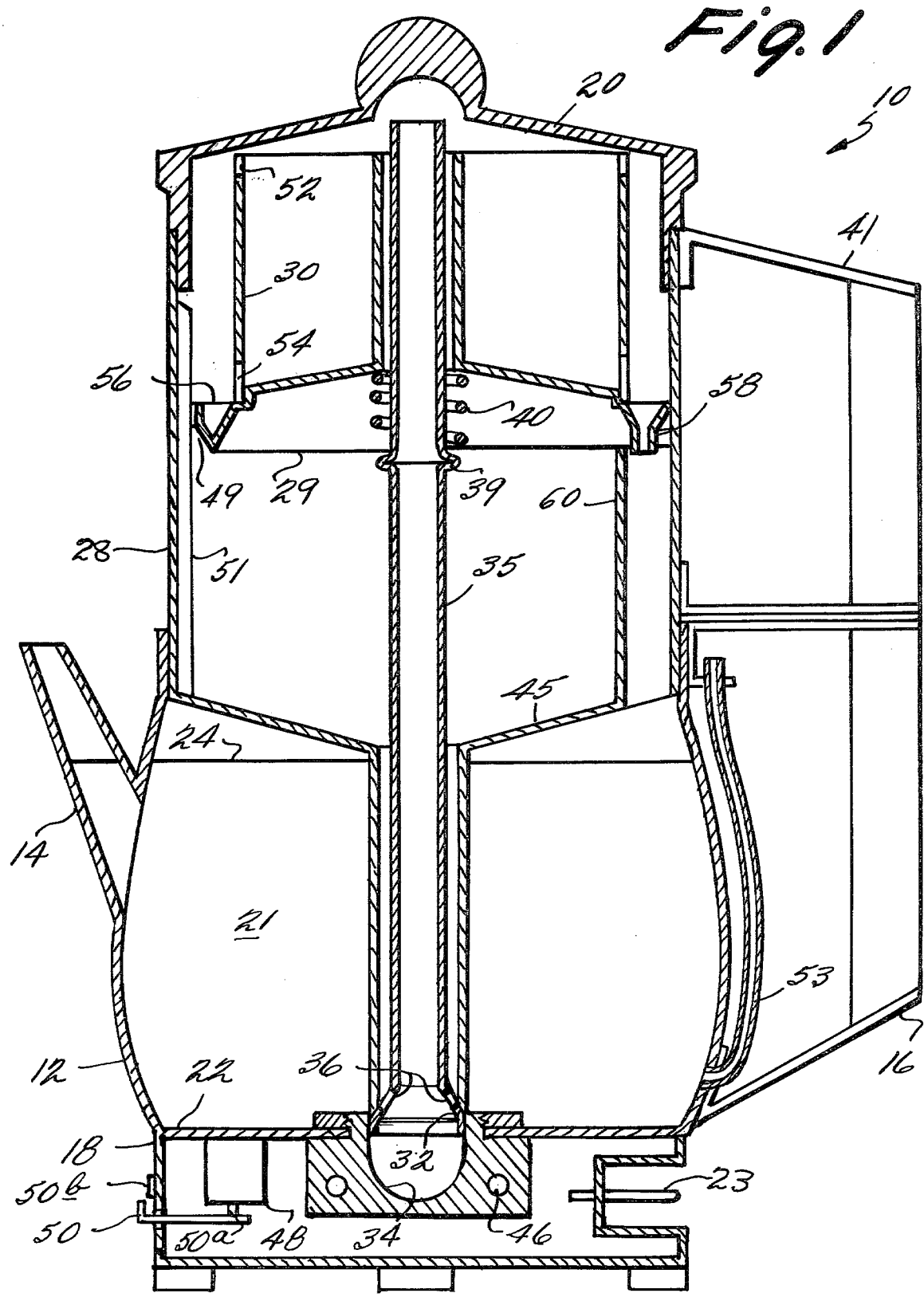
FIG. 1 is a vertical sectional view of a drip type coffee maker to make drip type beverage in accordance with the principles of the present invention.

As seen in FIG. 1, the drip-type coffee maker 10 includes a generally cylindrical beverage storage container body 12 provided with a pouring spout 14 and a handle 16. The body 12 rests on a cup shaped base 18. A cylindrical water reservoir 28 is disposed essentially above the body 12, though a small portion of the reservoir 28 may extend within the body 12 to obtain lateral position and to close off the upper opening of the body 12. The upper end of the reservoir 28 is fitted with a conventional cover 20, which will also fit the upper end opening of the body 12.

For purposes of this description, the internal space within the body 12, denoted herein as the beverage storage space 21, extends from the bottom wall 22 of the body 12 upwardly, the upper level of beverage being a variable always being below the opening of the spout. In the drawing, this level is indicated at 24.

The water reservoir 28 is positioned above the beverage storage space 21, and in accordance with the principles of the present invention the volume of the reservoir 28 relative to the space 21 is selected so that the unit is capable of making a maximum amount of preferred beverage. The water contents of the reservoir 28 occupy about 30% of the volume of the space 21, as compared to 50% when all beverage water is perked as in the prior technique.

The upper end of the water reservoir 28 is provided with a coffee basket 30, having a solid bottom surface which acts as an integrated drip shield 29 in somewhat the same manner as described in the aforementioned U.S. Pat. No. 3,380,374. The upper edge of the basket 30 engages the cover 20 which in turn is friction-fitted or mechanically locked into the upper end of the reservoir 28 so as to apply a downward clamping force on the coffee basket.

The coffee basket 30 contains perforations 52 in the upper part of the side wall to permit overflow in the event water is pumped to the coffee bed more rapidly than it will pass through the coffee bed, and to prevent this water returning to the pump well carrying dissolved beverage solids, and also to permit venting of any steam above, not through the coffee bed. These actions contribute to improved flavor through reduction of bitterness, according to CBC and other data.

Water passing downward through the coffee bed in the coffee basket 30 exits through orifices 54 in the side wall of basket 30, and is channelled by an annular trough 56, formed as part of the basket, to an opening 58. From the opening 58 the liquid passes into the upper end of a non-concentric bypass tube 60, formed as part of the reservoir 28, and thence into the beverage storage space 21.

The lower end of the water reservoir includes a hollow downward projecting percolator pump 32 which releasably engages within a percolator well 34 secured to or integral with the bottom wall 22. The pump 32 includes a conventional pump tube 35 which extends upwardly through the reservoir 28 and into the coffee basket 30. The lower end of the pump tube is open into the well 34. The lower end of the pump 32 may be provided with a typical pump valve which opens to allow an increment of water to enter the well 34 and which closes when the increment is partially converted to steam. As is known in the industry, suitably sized small holes may be used with no mechanical closure needed. The pump tube 35 carries a fixed flange 39 which supports the lower end of the coil spring 40. The upper end of the spring 40 bears against the drip shield 29 and is slightly compressed by the latter in order to maintain an upward force on the drip shield 29 and basket 30. This maintains the basket rim in contact with the cover 20 to prevent possible overflow of coffee grounds.

Figure 2:
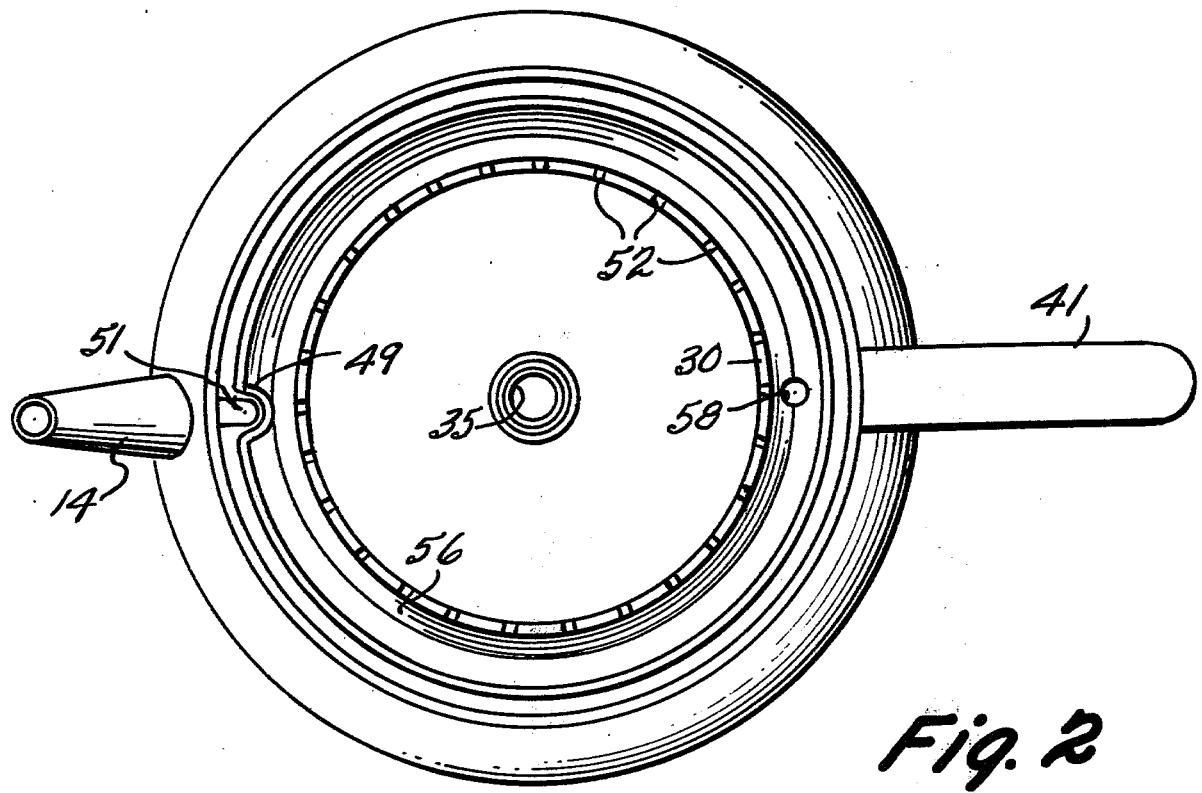
FIG. 2 is a plan view of the drip coffee maker of FIG. 1 with the top removed.

The water reservoir 28 is provided with a handle 41, as seen in FIGS. 1 and 2, for the purpose of removing and replacing the reservoir on the body 12. As shown, the handles 41 and 16 may be thin metal strips secured at the ends to the water reservoir 28 and the body 12 respectively and having grips 42 disposed exteriorly of the body 12. By being insulated and removed from the heat and moisture within the coffee maker, the handles provide a safe means of removing the internal components when brewing is complete. Also, by appropriate elevation over the rim of the coffee maker, the upper handle provides the user with a visual indication that the pump has been correctly inserted in the well.

Figure 3:
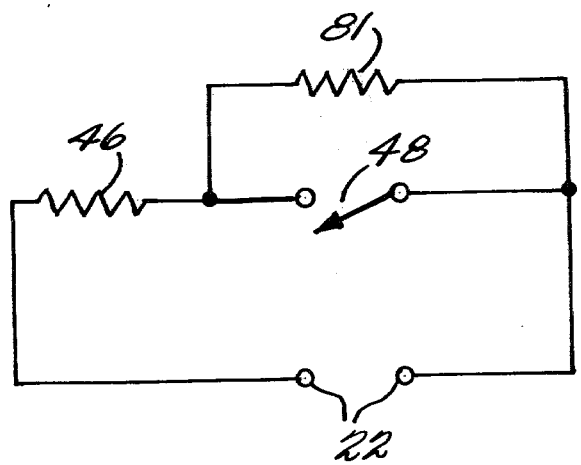
FIG. 3 is a schematic wiring diagram of a coffee maker employing one main heater and one thermostat.

The percolator well 34 is provided with an electric heating element 46, the arrangement being conventional in that a substantial portion of the heat from the element 46 is imparted to the interior of the well 34 and a portion of the heat is imparted to the bottom wall 22 by conduction. The circuit for the heating element 46 includes a keep warm heater 81 and a control device 48 which is adapted to reduce the current flow to the heating element 46 when the reservoir 28 is exhausted and/or the temperature of the beverage in the space 21 reaches a predetermined maximum value. The control device 48 may be a thermostatic switch which is manually adjustable so that, at a desired maximum temperature of the contents of the storage space 21, the keep-warm heater 81 is placed in series with the heating element 46. The electrical connections have been omitted from FIG. 1 but are shown schematically in FIG. 3. The thermostatic device illustrated includes a manual adjustment arm 50, pivoted for swinging movement about the axis of its vertical shaft 50a, which permits the operator to vary the temperature at which the thermostat will reduce the heat flow to the heating element 46. A scale 50b opposite the outer end of the arm 50 can be graduated with numbers representing cups to be brewed; moving the arm toward a higher number decreases the temperature at which the control device 48 will operate.

The body 12 of the percolator 10 also is provided with a transparent liquid level gauge 53 which communicates at its lower end with the beverage storage space 21. In the illustrated embodiment, the volume of the storage space 21 is approximately 10 cups of brewed beverage. However, in filling with water, 4 of the 10 cups remain in the reservoir and a 10 cup fill places only 6 cups of water in the body. Thus the liquid level sight gauge might be twice calibrated; once for water with the reservoir inserted for filling prior to brewing, and again on a second scale for brewed coffee. (See FIG. 8 for illustration of relationship). As an alternative to a sight gauge the entire wall might be transparent.

In order to place the drip coffee maker 10 into use, the cover 20 and coffee basket 30 are removed, and fresh ground coffee sufficient for making for example, 10 cups of beverage is added to the basket. The operator then pours water into the reservoir 28, filling the same and permitting 6 cups of water to overflow into storage space 21. Since the reservoir 28 contains about 4 cups, there is a total liquid volume of 10 cups, although only 4 cups are available to the percolator pump 32. Of course the 6 cups of water in the storage space 21 can be introduced separately without using the bypass technique, although the latter technique is more convenient. Thus, whereas the prior technique was to pump a volume of water equal to the volume of brewed beverage, the coffee maker of the present invention pumps a substantially lesser quantity.

The coffee basket 30 and drip shield 29 is then replaced over the pump tube 35 and into the reservoir 28. A slot 49 in the spreader 29 must align with a guide rail 51 in the reservoir 28, forcing opening 58 to align with the bypass tube 60. After replacement of the cap 20 the thermostat adjustment arm 50 is set opposite the 10-cup graduation on the scale 50b, and the heating element 46 is activated by connecting its circuit to the household electrical supply through pins 23.

At this time the contacts of the thermostatic switch 48 will be closed; current will flow through the heating element 46 but not through the keep-warm heater 81. Heating the percolator well 34 by heating element 46 takes place in the conventional manner to effect the perking or pumping of increments of hot water upwardly through the pump tube 35, whereby the heated increments flow downwardly through the coffee grounds and into the beverage storage space 21. This pumping action continues until all of the water in the reservoir has been transported to the coffee grounds and has dripped into the storage space 21. At this time, the temperature of the mixed coffee concentrate and the original 4 cups of water in the space 21 has reached the temperature at which the control 48 reduces the heat input to a level merely sufficient to maintain the total beverage at a desired temperature without boiling. When the control 48 operates, the single pole, single throw normally closed switch contacts open to the position shown in FIG. 3 thereby placing the keep-warm heater 81 in series with pump well heater 46 and reducing total heat input to the desired level. When pumping ceases, the water reservoir 28 is lifted by upper handle grips 42 and removed. The cover may be removed and placed under the reservoir and pump during transport to the sink, for example, to collect any remaining drops.

In order to avoid too rapid pumping of the lesser amount of water in the reservoir contemplated by this invention, the heat input to the well is relatively low. This would seem to introduce the disadvantage that the time required to heat the mixed beverage in the storage space to thermostatically controlled power reduction temperature is excessive. However, the heating element can be located so as to introduce more heat into the storage space relative to the heat input to the well, thus providing sufficient input to elevate the beverage to the desired temperature in the preferred time period.

Figure 4:
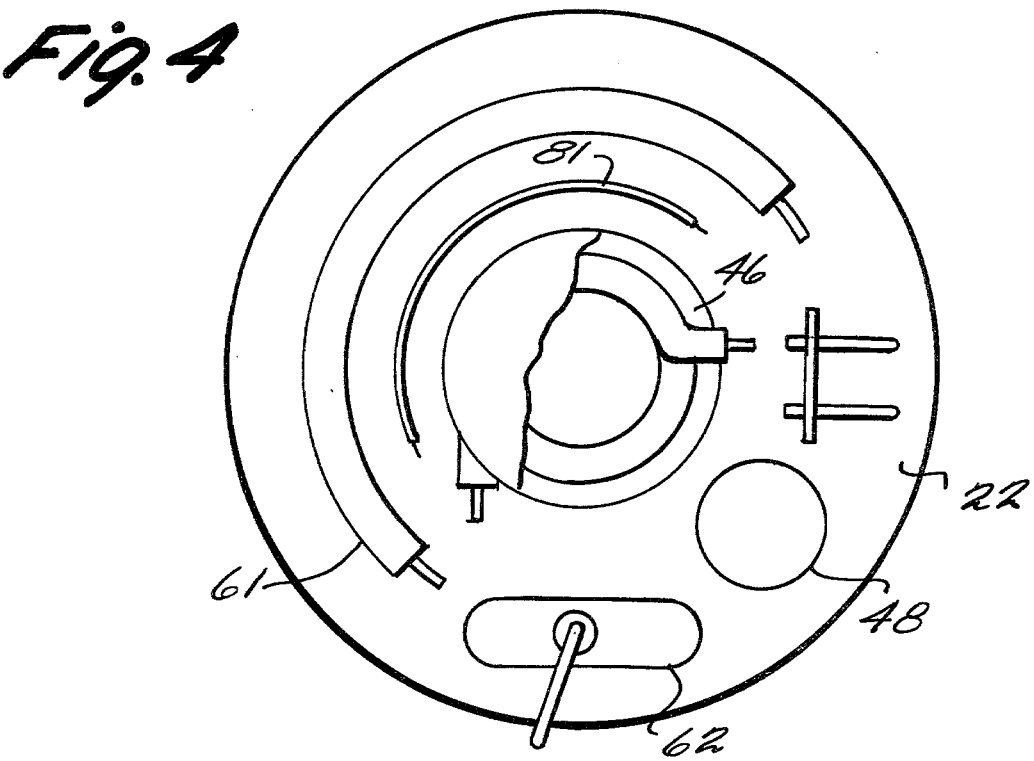
FIG. 4 is a bottom view of a coffee maker utilizing two main heating elements and two thermostats, one being adjustable.
Figure 5:
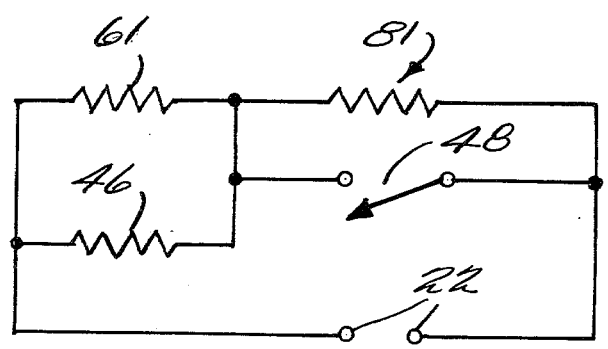
FIG. 5 is a schematic wiring diagram of a coffee maker employing two main heaters in time parallel.

In another embodiment, illustrated in FIGS. 4 and 5, the desired heat input may be accomplished by addition of a storage heater 61 which is wired electrically parallel to the pump well heater 46 and in series with the thermostatic control device 48. (Heater 61 is not used in this instance). At power turn-on after filling, the storage heater 61, in intimate contact with the bottom of the beverage storage space, heats the water which exceeded the capacity of the reservoir 28, while the pump well heater 46, positioned to direct most of its heat to the pump well 34, heats the water reaching the pump well from the reservoir 28. The coffee maker operates as previously described except that the two heaters 46 and 61 operate simultaneously, that is in time parallel, in lieu of the single heater with the distributed heat pattern. When the contacts of the control device are closed, current flows through both heaters 46 and 61 but not through the keep-warm heater 81. When the contacts are open, as illustrated in FIG. 5, reduced current flows through all of elements 46, 61 and 81. Heaters 46 and 61 may optionally be electrically connected in series.

In an embodiment not illustrated, each heater may be thermostated or otherwise separately controlled. In this embodiment, if thermostats are used for control, the pump well heater is electrically in series with a thermostat responsive to either the container contents or to the pump well heater. The container heater, electrically in series with a thermostat primarily responsive to the container contents, is electrically in parallel with the reservoir circuit. Such an arrangement, with a pump well heater thermostat responsive to the pump well heater, permits use of fixed thermostats while automatically controlling the heater in such a way that the reservoir will always be emptied and the container contents will always reach serving temperature without the need for adjusting the controls according to cups brewed.

Figure 6:
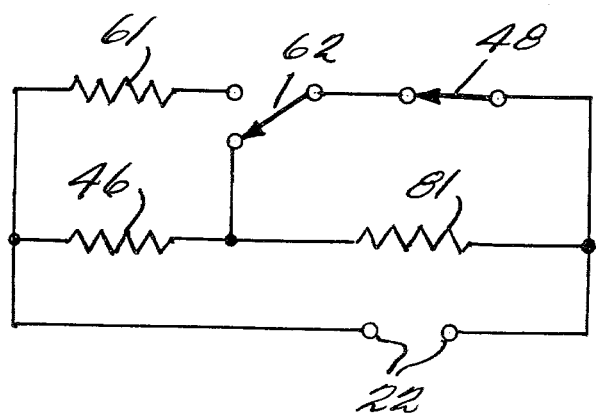
FIG. 6 is a typical schematic wiring diagram of a coffee maker employing two main heaters in time series.

In another embodiment, illustrated, the heat input may be accomplished by wiring the storage heater 61 to operate sequentially with the pump heater 46, the arrangement being controlled by a single pole, double throw thermostat 62 and the single pole, single throw thermostat 48 in series, as shown in FIG. 6. At power turn-on the thermostatic switch 48 is closed and the thermostatic switch 62 is in the position opposite that illustrated in FIG. 6, whereby the storage heater 61 draws full current. The pump well heater 46 draws very little current, since it is electrically in series with keep-warm heater 81. The storage heater 61, in intimate contact with the bottom of the beverage storage space 21, therefore begins to heat the water which exceeded the capacity of the reservoir 28. When the temperature of the storage space contents reaches a predetermined maximum, the thermostatic switch 62 moves down as viewed in FIG. 6 thereby turning off the storage heater 61 and providing full wattage to the pump well heater 46. The temperature of the contents of the storage space 21 continues to rise due to the addition of heated increments of liquid from the coffee basket. The total contents of the beverage storage space, when the reservoir 28 has been pumped dry or nearly dry, will have reached the desired keep-warm temperature of around 185° F. At this temperature the thermostatic switch 48 opens and places the keep-warm heater 81 in series with the pump well heater 46. Alternatively the circuit may be arranged so that the switch places the heater 81 in series with the storage heater 61. It will be recognized that all thermostat action can be combined in a single device of somewhat greater complexity than either 62 or 48 alone.

This time series operation of two heaters in addition to the keep-warm heater 81 also reduces bitterness of most percolator brewed beverage, since elevating the temperature of the water before brewing permits shorter brewing times for the same strength beverage. Operation is similar to that described for a drip coffee maker except that the beverage container and the water reservoir are not unique, being combined in one vessel.

It will also be recognized that either thermostat of the thermostatic switches 48 or 62 may be an adjustable thermostat when the heating elements are operated in time series.

Figure 7:
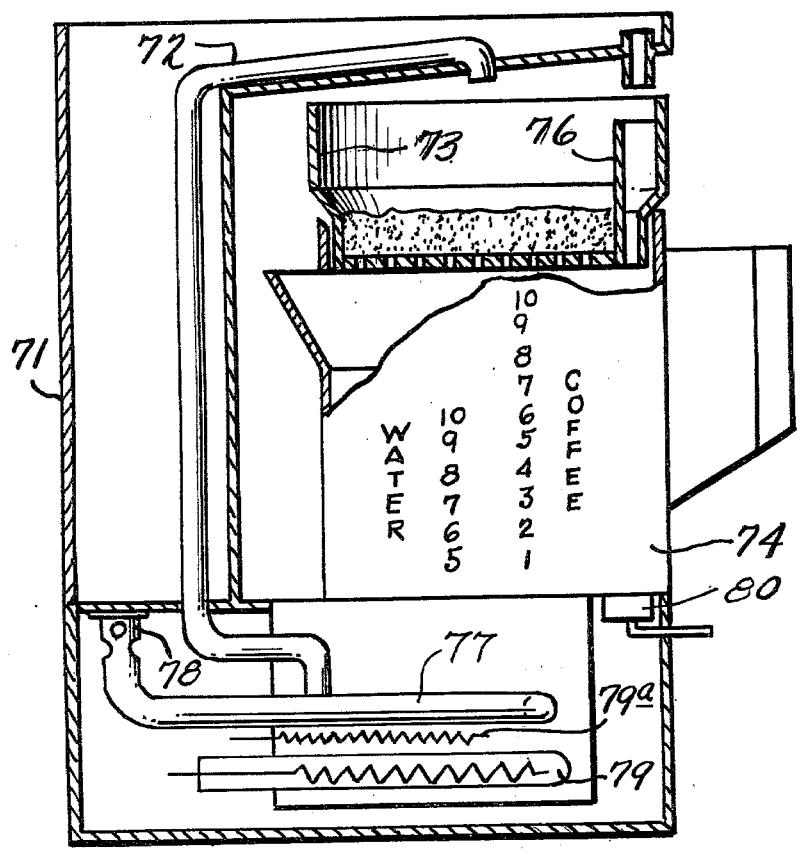
FIG. 7 is a schematic elevational view of a conventional type drip coffee maker using a pumping device and adapted in accordance with the present invention.

In the coffee maker of FIG. 7 a water tower reservoir 71 holds the water which is to be passed through the ground coffee. This water is converted to beverage by being heated and then transported by a pump tube 72 to a coffee basket 73, from which it drips into a separate, removable container supported on a special hot plate. In this embodiment a section of tube 77 acts as a pump well, in conjunction with a check valve 78. A heating element 79 is in thermal contact with the tube section 77 and with the beverage receptacle 74.

In accordance with the dilution feature of the present invention the water tower reservoir 71 need hold only approximately 4 cups of water for a 10 cup coffee maker. With 10 cups of water poured into the water tower reservoir 71 having a capacity of only 4 cups, the remaining 6 cups will overflow into the upper end of a vertical overflow tube 75 and then pour into a by-pass tube 76 and thence into the beverage container 74 without passing either to or through the coffee bed. If this container 74 is glass or has a transparent depth gauge the quantity of cups being brewed can be appropriately labelled at the various depths. When there are 6 cups of water in the container, the gauge would read 10 cups, since 4 cups remain in the water tower reservoir, and the user would then discontinue adding water. The user would get a readily visible indication of the correct amount of water for a range from 4 cups to 10 cups.

The hot plate also includes a keep-warm heater 79a. An adjustable thermostatic switch 80 is in thermal contact with the bottom of the container 74 when the latter is resting on the hot plate. A circuit such as that illustrated in FIG. 4 may be employed to supply current to the heating element 79 when the coffee maker is turned on and to place the low-power, keep-warm heater 79a in series with the heating element 79 when the bottom of the container 74 reaches a predetermined temperature. The depth gauge has a second calibration for quantity of finished beverage, since all liquid is in the beverage container on completion of brewing.

Figure 8:
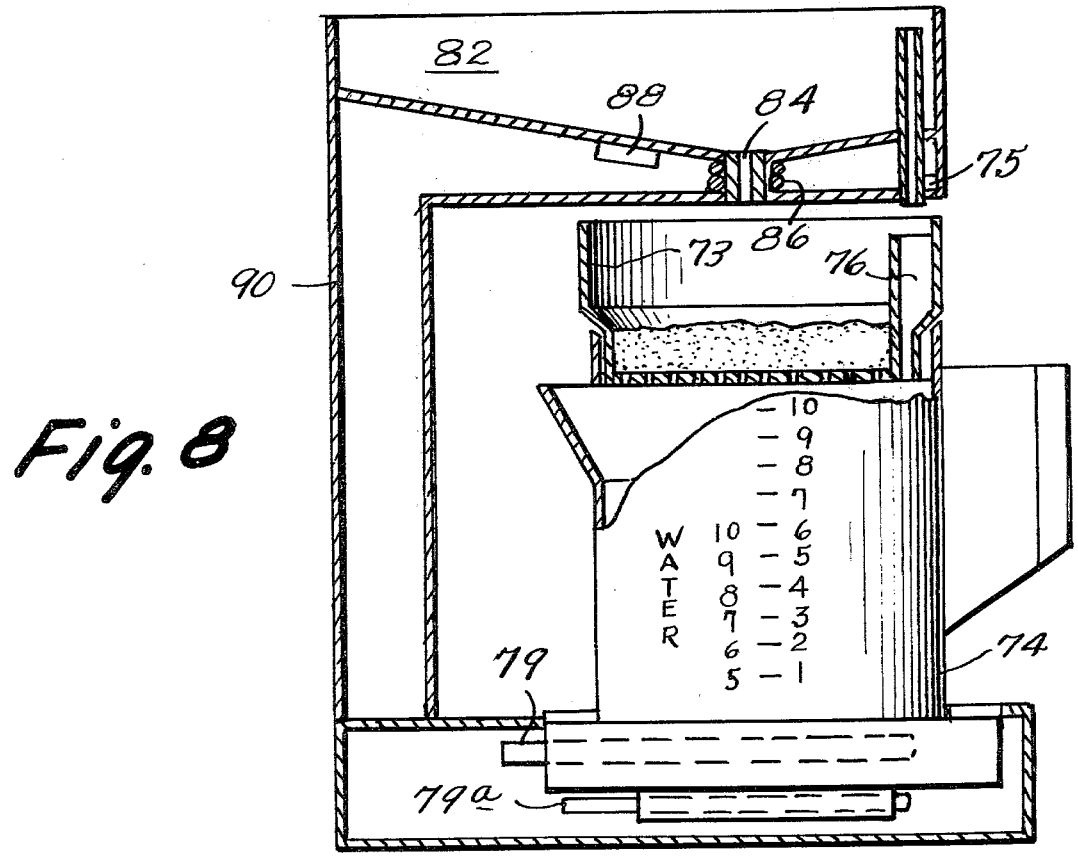
FIG. 8 is a schematic elevational view of a conventional type drip coffee maker using gravity feed to the coffee basket.

The coffee maker of FIG. 8 is similar to that of FIG. 7 except that in the FIG. 8 embodiment water is supplied to the bed of ground coffee by gravity rather than by a pump, and the reservoir support tower 90 does not hold water. The beverage container 74 rests on a special hot plate which is provided with a main heater 79 and a keep-warm heater 79a. An overhead reservoir 82 is disposed above the container 74 on support tower 90 so that water overflowing through the overflow tube 75 flows through the bypass tube 76 directly into the container. The bottom wall of the reservoir 82 is provided with a vertical outlet tube 84 having a restricted bore such that water flows therethrough at a low rate. Surrounding the tube 84 is an electrical heating element 86.

When the coffee maker of FIG. 8 is to be used the operator pours a volume of water equal to the desired total volume of beverage into the reservoir 82 with the result that the excess water flows through the tubes 75 and 76 to the container. The coffee maker is then connected to a source of current whereupon the heating element 86 heats the water which is slowly flowing through the tube 84. Simultaneously the heating element 79 begins to heat the liquid in the container 74. When the reservoir 82 becomes empty the temperature of its bottom wall rises and a thermostatic switch 88 turns off the heater 86 and places the keep-warm heater 79a in series with the heater 79. The circuits of FIGS. 5 and 6 may be used for this purpose.

The space saving and material saving, flavor enhancing overflow process is not limited to coffee makers utilizing an incremental pumping arrangement to transport the water to the coffee bed. It should be readily apparent that the process will operate advantageously whether such transport is incremental or continuous, and regardless of the motivating force.

It should also be apparent that the pump and pump well may employ various configurations wherever they are used. For example, the well may be a portion of a tube or it may result from placing a concave pump over a convex heater in addition to the more generally employed configuration utilizing a concave, heated pump well.

Timing devices, either mechanical or electrical or a combination of both, may be employed in place of thermostats to control the switches for the heaters. For example in the FIG. 1 embodiment a timer may be arranged to begin a timing operation when the coffee maker is turned on. The timer will be manually adjustable so that it can be set to open the switch contacts after a period of time sufficient for pumping of all the water from the reservoir and sufficient to raise the temperature of the total beverage to serving temperature.

What is claimed is:

1. Apparatus of the type which makes an infusion type beverage by heating water, passing the heated water once through a mass of solid material and storing the resulting beverage separately from the water being heated, said apparatus comprising: a beverage container having a bottom wall and a side wall and being capable of holding a predetermined maximum volume of beverage; a perforated basket located above said container for holding material from which the beverage is to be made; a water supply reservoir capable of holding a predetermined maximum volume of water, said maximum volume of said reservoir being substantially less than said maximum volume of said container; bypass passage means communicating with said reservoir and with said container in such a manner that water in excess of said maximum volume of said reservoir is passed to said container when water is delivered into said reservoir; heating means for heating the contents of said container and the contents of said reservoir; means for passing heated water from said reservoir through said basket means to said container whereby concentrated brew leaving said basket means mixes with the contents of said container; and control means for reducing the heat imparted to the contents of the reservoir and to the contents of said container when continued temperature elevation is not required.

2. Apparatus as in claim 1 wherein said heating means has a first output portion imparting heat to the contents of said reservoir and a second output portion simultaneously imparting heat to said bottom wall of said container and further including thermostatic control means responsive to a predetermined high temperature of the liquid in said container for reducing both heat outputs, said control means being manually adjustable so as to reduce said heat outputs in response to any of a plurality of temperatures of the liquid in said container.

3. Apparatus as in claim 1 wherein said heating means includes an electrical storage heating element associated with said container and a separate electrical heating element associated with said reservoir and further includes adjustable thermostatic control means operable in a brewing mode to supply current to both said heating elements simultaneously and operable in a keep-warm mode in response to a predetermined high temperature of the liquid in said container to reduce the current to at least one of said heating elements.

4. Apparatus as in claim 1 wherein said heating means includes an electrical storage heating element associated with said container and a separate electrical heating element associated with said reservoir and further includes adjustable thermostatic control means operable in a first mode to supply current to only one of said heating elements and operable in a second mode in response to a first predetermined high temperature of the liquid in said container to reduce the supply of current to said one heating element and to supply current to the other heating element.

5. Apparatus as in claim 4 wherein said control means is operable in a third mode in response to a second predetermined high temperature, higher than said first predetermined temperature, to reduce current to said other heating element which receives current during the second mode.

6. Apparatus for making an infusion type beverage comprising: a water reservoir; perforated basket means for holding material from which beverage is to be made; means for heating water obtained from said reservoir and for discharging heated water to said basket means so that the heated water passes through the material and flows from said basket means in the form of concentrated beverage; a beverage container disposed to receive concentrated beverage flowing from said basket means, said reservoir having a maximum water-holding capacity which is substantially less than the maximum beverage-holding capacity of said container whereby by initially placing water in both said reservoir and said container said apparatus is capable of making a quantity of final beverage which is greater than the quantity of water passed through said basket means by the amount of water initially placed in said container, and means for heating the contents of said container.

7. Apparatus as in claim 6 wherein said means for heating water obtained from the reservoir and said means for heating the contents of the container comprise separate heaters.

8. Apparatus as in claim 7 including heater control means operable to energize said separate heaters in sequence.

9. Apparatus as in claim 8 wherein said heater control means is responsive to a predetermined high temperature of the contents of the container.

10. Apparatus as in claim 8 wherein said heater control means includes a thermostatic switch which is responsive to a predetermined high temperature of the contents of the container.

11. Apparatus as in claim 8 wherein said heater control means includes a first thermostatic switch which is responsive to a first predetermined high temperature of the contents of the container to reduce energization of the heater associated with the reservoir water and to energize the other heater and a second thermostatic switch which is responsive to a second and higher temperature of the contents of the container to reduce energization of said other heater.

12. Apparatus as in claim 6 wherein said means for heating water obtained from the reservoir and said means for heating the contents of the container comprise a single heater having a first output portion imparting heat to the contents of the reservoir and a second output portion imparting heat simultaneously to the contents of the container and control means operable to reduce both heat outputs when the reservoir becomes empty.

13. Apparatus as in claim 12 wherein said control means includes a thermostatic switch responsive to a predetermined high temperature of the contents of the container.

14. A beverage maker comprising: a container having a side wall and a bottom and an open upper end, said bottom being provided with a perk-type pump well; a water reservoir having a side wall and an open upper end and a central vertical pump tube, said tube having an upper end and a lower end cooperating with said well; a connecting tube surrounding said pump tube and connecting the lower end of said reservoir to the lower end of said pump tube; said reservoir being releasably supported by said container in a position such that essentially all of the side wall of the reservoir is disposed above the upper end of said container, said reservoir including a non-central tubular passage located laterally outwardly of said connecting tube, said passage having an open upper end and an open lower end communicating with the interior of said container; perforated basket means substantially within said reservoir for holding a mass of material from which the beverage is to be made by infusion of hot water and arranged to receive increments of hot water from the upper end of the pump tube, said basket including means for directing all of the liquid flowing from its perforations to the upper end of said tubular passage; and a cover releasably engaging and supported by the open upper end of said reservoir, said cover having a top wall overlying said basket means so as to deflect increments of hot water from the upper end of the pump tube into said basket means.

15. A beverage maker as in claim 14 wherein the means for directing liquid from the basket means includes an annular trough surrounding the basket means and communicating with the upper end of said tubular passage.

* * * * *